(12) United States Patent
Srivastava

(10) Patent No.: US 10,025,318 B2
(45) Date of Patent: Jul. 17, 2018

(54) SHAPE DETECTING AUTONOMOUS VEHICLE

(71) Applicant: QUALCOMM Incorporated, San Diego, CA (US)

(72) Inventor: Aditya Narain Srivastava, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 15/274,199

(22) Filed: Sep. 23, 2016

(65) Prior Publication Data

US 2018/0039283 A1 Feb. 8, 2018

Related U.S. Application Data

(60) Provisional application No. 62/371,576, filed on Aug. 5, 2016.

(51) Int. Cl.
| | | |
|---|---|---|
| *G05D 1/02* | (2006.01) | |
| *B60W 40/13* | (2012.01) | |
| *B60W 40/06* | (2012.01) | |
| *B64C 39/02* | (2006.01) | |
| *B64D 47/08* | (2006.01) | |
| *G01S 17/93* | (2006.01) | |

(52) U.S. Cl.
CPC ........... *G05D 1/0276* (2013.01); *B60W 40/06* (2013.01); *B60W 40/13* (2013.01); *B64C 39/024* (2013.01); *B64D 47/08* (2013.01); *G01S 17/936* (2013.01)

(58) Field of Classification Search
CPC .... G05D 1/0276; G01S 17/936; B64D 47/08; B60W 40/06; B60W 40/13; B64C 39/024
USPC ............................................................ 701/23
See application file for complete search history.

(56) References Cited

U.S. PATENT DOCUMENTS

| | | |
|---|---|---|
| 9,031,089 B2 | 5/2015 | Rubin et al. |
| 2010/0256836 A1 | 10/2010 | Mudalige |
| 2011/0181457 A1* | 7/2011 | Basten .................. G01B 7/042 |
| | | 342/70 |
| 2013/0138288 A1 | 5/2013 | Nickolaou et al. |
| 2014/0330479 A1 | 11/2014 | Dolgov et al. |

OTHER PUBLICATIONS

Minguez J., et al., "Extending Reactive Collision Avoidance Methods to Consider any Vehicle Shape and the Kinematics and Dynamic Constraints," Submitted as a Regular Paper to the IEEE Transactions on Robotics, 2008, 13 pages.

* cited by examiner

*Primary Examiner* — Brian P Sweeney
(74) *Attorney, Agent, or Firm* — Paradice and Li LLP

(57) ABSTRACT

According to various embodiments, there is provided a method for controlling a vehicle, the method including detecting a triggering event. The method further includes, in response to detecting the triggering event, determining updated dimensions of the vehicle. The method further includes adjusting operation of the vehicle based on the updated dimensions.

30 Claims, 4 Drawing Sheets

SHAPE DETECTING AUTONOMOUS VEHICLE

This application claims priority from U.S. Provisional Application No. 62/371,576, filed Aug. 5, 2016, incorporated herein by reference in its entirety.

BACKGROUND

Vehicles capable of being fully or partially autonomous or self-driving are being developed for a variety of uses. Various characteristics of a vehicle may affect how the vehicle operates autonomously or semi-autonomously (e.g., turn radius, number of wheels, braking distance or power, height, width and length clearances, etc.). Control technology for a self-driving vehicle may be configured in accordance with certain characteristics of that vehicle. However, in certain contexts, one or more characteristic of a vehicle may change over time. For example, a vehicle's overall shape may change (e.g., when attaching a trailer, a bike rack, luggage, etc.), which may affect how the vehicle operates.

SUMMARY

Various aspects relate to a vehicle capable of determining its shape and controlling vehicle operation based on the determined shape, and, in particular examples, to an autonomous vehicle capable of determining a change of shape and altering vehicle operation based on the changed shape.

According to various aspects, a method for controlling an autonomous vehicle includes detecting a triggering event. The method further includes, in response to detecting the changed shape event, determining updated dimensions of the vehicle. The method further includes adjusting operation of the vehicle based on the updated dimensions.

In some aspects, the triggering event includes detecting a changed shape event of the vehicle.

In some aspects, detecting the changed shape event includes detecting a parameter associated with the vehicle and determining whether the parameter exceeds a threshold.

In some aspects, the parameter corresponds to one or more of a weight, wind drag, or engine torque of the vehicle.

In some aspects, the method further includes determining one or more surrounding conditions of the vehicle, and detecting the changed shape event of the vehicle based in part on the determined one or more surrounding road conditions.

In some aspects, the one or more surrounding conditions includes at least one of wind force, road slope, radius of curvature of a road, or road terrain.

In some aspects, determining the updated dimensions of the vehicle includes sending a scan request to one or more vehicles proximate the vehicle, receiving an at least partial scan of the vehicle from one of the one or more proximate vehicles, and constructing the updated dimensions of the vehicle based on at least one of the received at least partial scans.

In some aspects, the scan request is sent via vehicle-to-vehicle (V2V) communication.

In some aspects, the at least partial scan is a Light Detection and Ranging (LIDAR) scan.

In some aspects, adjusting the operation of the vehicle includes adjusting at least one of speed, braking, navigation, turning, clearance allowance, or parking behavior.

In some aspects, the vehicle includes one or more sensors including at least one of an engine sensor configured to detect engine torque, a weight sensor configured to detect a weight of the vehicle, a wind sensor configured to detect wind forces against the vehicle, or a cargo sensor configured to detect presence of objects affixed to the vehicle.

In some aspects, determining the updated dimensions of the vehicle includes sending a scan request to one or more scanning devices proximate the vehicle, receiving an at least partial scan of the vehicle from at least one of the one or more scanning devices, and constructing the updated dimensions of the vehicle based on at least one of the received at least partial scans.

In some aspects, the at least one of the one or more scanning devices includes another vehicle.

In some aspects, at least one of the one or more scanning devices includes an unmanned aerial vehicle.

In some aspects, at least one of the one or more scanning devices comprises a camera arranged on a fixed object.

According to various aspects, a controller in a vehicle comprises memory and a processor coupled to the memory and configured with processor-executable instructions to detect a triggering event. The processor may be further configured to, in response to detecting the triggering event, determine updated dimensions of the vehicle. The processor may be further configured to adjust operation of the vehicle based on the updated dimensions.

In some aspects, the triggering event includes detecting a changed shape event of the vehicle.

In some aspects, the processor may be further configured to detect the changed shape event by detecting a parameter associated with the vehicle and determining whether the parameter exceeds a threshold.

In some aspects, the parameter corresponds to one or more of a weight, wind drag, or engine torque of the vehicle.

In some aspects, the processor is further configured to determine one or more surrounding conditions of the vehicle, and detect the changed shape event of the vehicle based in part on the determined one or more surrounding road conditions.

In some aspects, the one or more surrounding conditions includes at least one of wind force, road slope, radius of curvature of a road, or road terrain.

In some aspects, the processor is further configured to determine the updated dimensions of the vehicle by sending a scan request to one or more vehicles proximate the vehicle, receiving an at least partial scan of the vehicle from at least one of the one or more proximate vehicles, and constructing the updated dimensions of the vehicle based on at least one of the received at least partial scans.

In some aspects, the at least partial scan is a Light Detection and Ranging (LIDAR) scan.

In some aspects, the processor is further configured to adjust the operation of the vehicle by adjusting at least one of speed, braking, navigation, turning, clearance allowance, or parking behavior.

In some aspects, the processor is further configured to determine the updated dimensions of the vehicle by sending a scan request to one or more scanning devices proximate the vehicle, receiving an at least partial scan of the vehicle from at least one of the one or more scanning devices, and constructing the updated dimensions of the vehicle based on at least one of the received at least partial scans.

In some aspects, at least one of the one or more scanning devices comprises another vehicle.

According to various aspects, an apparatus for controlling a vehicle is provided and includes means for detecting a triggering event of the vehicle. The apparatus further includes, in response to detecting the triggering event, means for determining updated dimensions of the vehicle.

The apparatus further includes means for adjusting operation of the vehicle based on the updated dimensions.

In some aspects, the triggering event includes detecting a changed shape event of the vehicle.

In some aspects, the means for determining the updated dimensions of the vehicle includes means for sending a scan request to one or more vehicles proximate the vehicle, means for receiving an at least partial scan of the vehicle from at least one of the one or more proximate vehicles, and means for constructing the updated dimensions of the vehicle based on at least one of the received at least partial scans.

According to various aspects, a vehicle including a non-transient computer-readable medium includes program instruction that, when executed, causes a computer to detect a triggering event, in response to detecting the triggering event, determine updated dimensions of the vehicle, and adjust operation of the vehicle based on the updated dimensions.

BRIEF DESCRIPTION OF THE DRAWINGS

The accompanying drawings, which are incorporated herein and constitute part of this specification, illustrate exemplary embodiments of the disclosure, and together with the general description given above and the detailed description given below, serve to explain the features of the various embodiments.

DETAILED DESCRIPTION

Figure 1A:
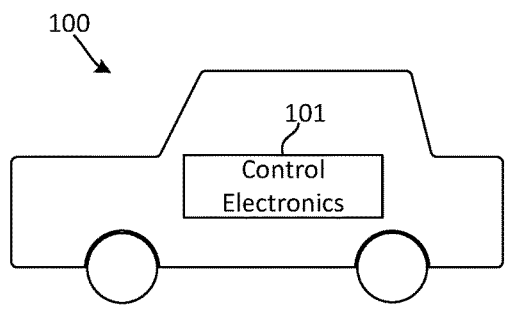
FIGS. 1A, 1B, 1C, and 1D are side views of diagrams illustrating an autonomous vehicle according to various embodiments.
Figure 1B:
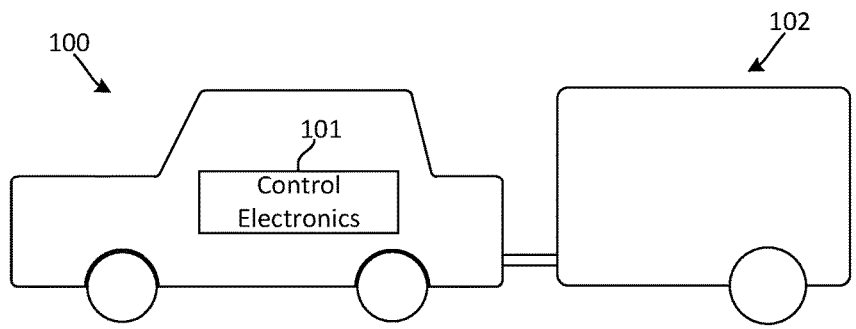
Figure 1C:
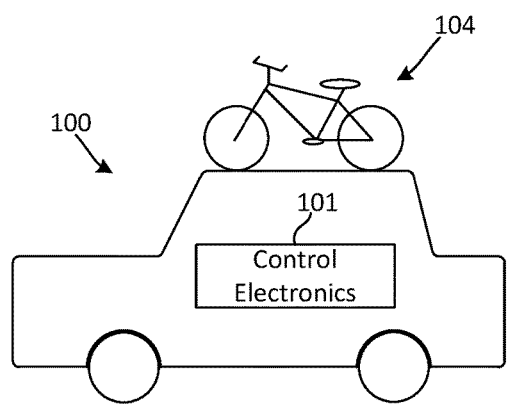
Figure 1D:
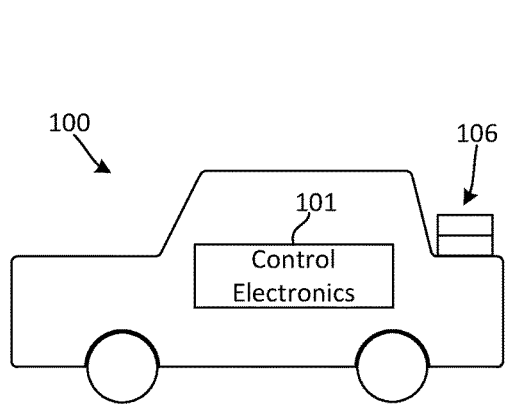

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

According to various embodiments, an autonomous (or partially autonomous) vehicle is configured to store and/or access information regarding the shape of the vehicle (e.g., height, length, width, mass, etc.). Controlling electronics within the vehicle may adjust its operation (e.g., turn radius, parking behavior, negotiating clearances, braking distance, etc.) based on its shape information. In addition, the autonomous vehicle may detect that a shape change event has occurred at the vehicle (e.g., when a user attaches a trailer or a bike rack, or stows luggage on a roof rack, etc.). As such, after detecting that a shape change event has occurred, the vehicle can trigger a scan to determine the vehicle's new shape, and the vehicle can adjust its operation based on the new shape information.

FIGS. 1A, 1B, 1C, and 1D are side views of diagrams illustrating an autonomous vehicle 100 according to various embodiments. The autonomous vehicle 100 includes control electronics 101 configured to control operations of the vehicle 100. For example, the control electronics 101 may control speed, control braking, control turning, control navigation, perform wireless communication, perform environment scanning, detect whether the vehicle 101 has a changed shape, trigger a scanning procedure to determine a new shape of the vehicle 100, and/or the like.

In some embodiments, the autonomous vehicle 100 is configured to operate (e.g., drive) autonomously (e.g., without substantial user input) by the control electronics 101. In other words, in some embodiments, the autonomous vehicle 100 is capable of autonomous control with good performance under significant uncertainties in an environment for extended periods of time, and the ability to compensate for system failures without external intervention. For example, with respect to its automated driving capabilities, the autonomous vehicle 100 may be capable of interpreting sensory information to identify appropriate navigation paths, obstacles, relevant signage, other vehicles on the road, or the like, and adjust its operation (e.g., speed or path) in response to the sensory information.

In some embodiments, the autonomous vehicle 100 is configured to operate in less than complete autonomy. In particular embodiments, the autonomous vehicle 100 performs safety-critical functions (e.g., steering, braking, etc.), but may cede control of such functions in certain conditions (e.g., heavy traffic, busy intersection, etc.) to the driver for manual control of the vehicle 100. In some embodiments, the autonomous vehicle 100 is configured to operate in complete or near-complete autonomy. In particular embodiments, the autonomous vehicle 100 is configured to perform all safety-critical function for the entire trip, with the driver not controlling the vehicle 100 at any time.

In some embodiments, the autonomous vehicle 100 is further capable of wireless communication locally (e.g., with other nearby vehicles or wireless communication devices) and/or via long-range (e.g., with a central server that monitors vehicle activities). Furthermore, in some embodiments, the autonomous vehicle 100 is configured to detect its environment or surroundings using any suitable technique, such as, but not limited to, radar, Light Detection and Ranging (LIDAR), Global Positioning System (GPS), odometry, computer vision, or the like.

In particular embodiments, the autonomous vehicle 100 is a car. In other embodiments, the autonomous vehicle 100 is a truck, a van, a sports utility vehicle (SUV), or the like. In yet other embodiments, the autonomous vehicle 100 is a transport vehicle that is designed to tow one or more trailers (e.g., a semi-trailer truck). The transport vehicle may be designed to tow other vehicles, such as, but not limited to, cars, vans, or the like. In other embodiments, the autonomous vehicle 100 is a military vehicle or a delivery truck. In further embodiments, the autonomous vehicle 100 is a motorized bicycle, tricycle, or other self-propelled, wheeled device, such as but not limited to, a motorcycle, a scooter, a moped, or the like. In some embodiments, the autonomous vehicle 100 is a vehicle capable of traveling by air, water, space, or by another path other than by ground. For example, the autonomous vehicle 100 may be a manned or unmanned aerial vehicle (e.g., an airplane, a drone, etc.), a water-based vehicle (e.g., a submarine, a boat, etc.), a balloon (e.g., a hot air balloon, weather balloon, etc.), a spaceship, a train, and/or the like.

Under particular circumstances, a driver or user (or other entity) of the autonomous vehicle 100 may add a load to the vehicle 100 or otherwise alter the original shape of the vehicle 100. For example, the autonomous vehicle 100 may include a rack, hitch, surface, or the like, configured or suitable to hold or secure a load that alters the shape of the vehicle. In some cases, the rack or the like may itself alter the original shape of the vehicle. In other cases, the rack or the like may be considered part of the original shape of the vehicle. For example, a trailer 102 may be affixed to a hitch or other connection structure at the rear of the autonomous vehicle 100 such that the vehicle 100 and the trailer 102 travel as one. As such, the vehicle 100 having the attached trailer 102 undergoes a changed shape from its original form (e.g., as shown in FIG. 1A). That is, the vehicle 100 with the trailer 102 combine to form a longer vehicle than the vehicle 100 without the trailer 102.

In other situations, the autonomous vehicle 100 includes a load 104 or 106 on the vehicle 100. For example, the autonomous vehicle 100 may include a rack, surface or other structure to carry a load 104 on its roof. The load 104 fastened on the roof of the vehicle 100 may be any user-placed object, such as, but not limited to, a bicycle, luggage, a cargo carrier, or the like. By appending the load 104 on the roof of the autonomous vehicle 100, the vehicle 100 exhibits a changed shape from its original form (e.g., as shown in FIG. 1A). For example, the autonomous vehicle 100 having the load 104 fastened to its roof is taller than its original shape.

In further situations, the autonomous vehicle 100 may include a rack, surface or other structure to carry the load 106 at its rear (or other suitable location). The load 106 may be carried in the trunk or in the bed of the autonomous vehicle 100. In some cases, this may require the trunk to be at least partially opened (but still secured) The load 106 carried at the rear of the vehicle 100 may be any user-placed object, such as, but not limited to, equipment, luggage, another vehicle (e.g., a motorcycle), and so on. By fastening the load 106 at the rear of the autonomous vehicle 100, the vehicle 100 exhibits a changed shape from its original form (e.g., as shown in FIG. 1A). For example, the autonomous vehicle 100 having the load 106 fastened to its rear may be taller or longer than its original form, depending on how highly stacked the load is or how far the load 106 extends beyond the rear end of the original form of the autonomous vehicle 100.

Figure 2:
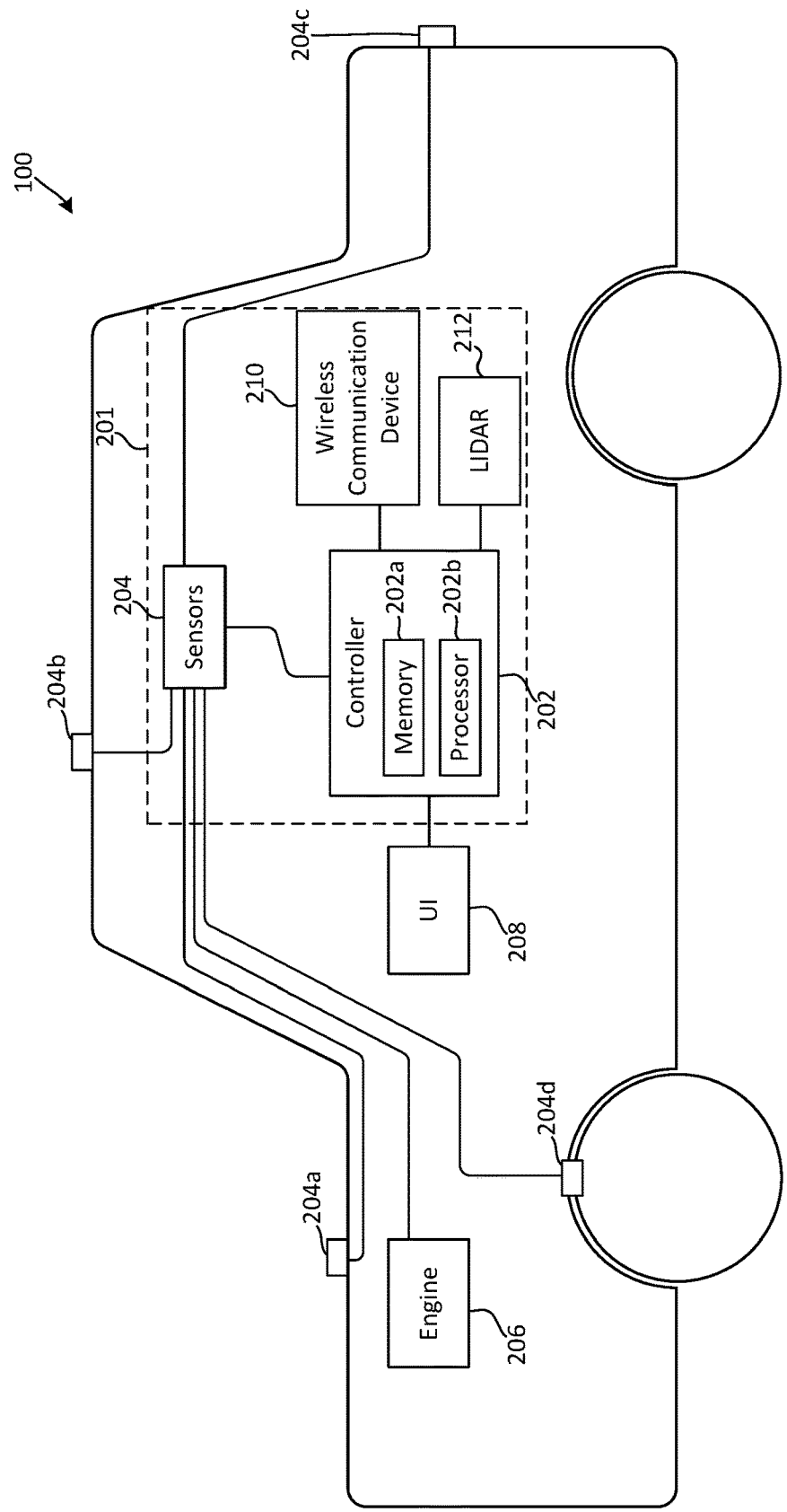
FIG. 2 is a block diagram of components of an autonomous vehicle according to various embodiments.

FIG. 2 is a block diagram of components of the autonomous vehicle 100 according to various embodiments. Referring to FIGS. 1A-2, in some embodiments, the autonomous vehicle 100 includes controlling electronics 201. In some embodiments, the controlling electronics 201 may be similar to the controlling electronics 101 and include a controller 202, one or more sensors 204 connected to the controller 202, a wireless communication device 210 connected to the controller 202, and a LIDAR device 212 connected to the controller 202. The autonomous vehicle 100 further includes an engine 206 connected to the one or more sensors 204 and a user interface (UI) 208 connected to the controller 202. Such controlling electronics 201 is just one example configuration as any other suitable configurations may be implemented.

In some embodiments, the controller 202 is a component or module of the autonomous vehicle 100. The controller 202 may be pre-installed in the autonomous vehicle 100 by an original manufacturer or other entity. In some embodiments, the controller 202 is located at any suitable location on the autonomous vehicle 100, such as, but not limited to, under a hood, underneath the body, in the rear, or the like. In some embodiments, the controller 202 is configured to transmit control signals to one or more other components or modules of the autonomous vehicle 100 for controlling operation of the other modules, such as, but not limited to, the sensors 204, the engine 206, the UI 208, the wireless communication device 210, the LIDAR device 212, a braking system, a steering system, a navigation system, and so on. For example, the controller 202 may be configured to regulate or control the engine 206 such that the autonomous vehicle 100 does not exceed a speed limit of a particular section of a road.

As another example, the controller 202 may be configured to control navigation, braking, speed, steering, or the like of the autonomous vehicle 100 based on conditions surrounding or internal to the autonomous vehicle 100. In particular embodiments, the controller 202 controls a braking system of the autonomous vehicle 100 to slow the autonomous vehicle 100 when another vehicle is detected in front of the autonomous vehicle 100 (e.g., sensed by the LIDAR device 212). Similarly, the controller 202 may be configured to control or regulate operation of the autonomous vehicle 100 in response to sensing that the autonomous vehicle 100 has changed its shape from its original shape, such as by the addition of a trailer 102 or a load 104 or 106.

As such, the controller 202 may control various motion characteristics or communication operations (e.g., via the wireless communication device 210) of the autonomous vehicle 100, such as, but not limited to, speed, trajectory, navigation path, steering, braking, sending or receiving data with nearby vehicles or with a central server, or the like, by controlling various other modules of the autonomous vehicle 100 (e.g., the engine 206, steering or braking systems of the vehicle 100, etc.).

In some embodiments, the controller 202 includes a memory 202a and a processor 202b. The memory 202a and the processor 202b may operate with each other to store and run software related to controlling the operation of the autonomous vehicle 100. For example, the processor 202b may process software and/or data stored on the memory 202a, where such software may control the processor 202b to perform functions of the controller 202.

According to some embodiments, the memory 202a may be a non-transitory processor-readable storage medium that stores processor-executable instructions. The memory 202a may include any suitable internal or external device for storing software and data. Examples of the memory 202a may include, but are not limited to, random access memory (RAM), read only memory (ROM), floppy disks, hard disks, dongles, or other recomp sensor board (RSB) connected memory devices, or the like. The memory 202a may store an operating system (OS), user application software, and/or executable instructions. The memory 202a may also store application data, such as, but not limited to, an array data structure.

According to some embodiments, the processor 202b may be a general-purpose processor. The general-purpose processor 202*b* may include any suitable data processing device, such as, but not limited to, a microprocessor. In the alternative, the general-purpose processor 202*b* may be any suitable electronic processor, controller, microcontroller, or state machine. The general-purpose processor 202*b* may also be implemented as a combination of computing devices (e.g., a combination of a digital signal processor (DSP) and a microprocessor, a plurality of microprocessors, at least one microprocessor in conjunction with a DSP core, or any other suitable configuration).

In some embodiments, the autonomous vehicle 100 further includes the one or more sensors 204 for monitoring characteristics of the autonomous vehicle 100 and conditions in the local environment outside of the autonomous vehicle 100. In some embodiments, the one or more sensors 204 include any suitable detection device or devices for sensing characteristics of the autonomous vehicle 100 or environmental conditions outside of the autonomous vehicle 100, such as, but not limited to, an engine sensor configured to detect characteristics of the engine 206, a weight sensor configured to detect a weight of the autonomous vehicle 100, a wind sensor configured to detect wind forces against the vehicle, an equipment sensor configured to detect presence of objects affixed to the vehicle, or the like.

As such, the sensors 204 may include one or more detectors 204*a*, 204*b*, 204*c*, and 204*d* located at particular locations at the autonomous vehicle 100 for receiving certain data relating to road conditions or other environmental conditions outside of the autonomous vehicle 100 or detecting parameters of the vehicle 100. In particular embodiments, the sensors 204 include a wind force detector 204*a*, a roof cargo detector 204*b*, a rear cargo detector 204*c*, and a weight detector 204*d*. In some embodiments, the wind force detector 204*a* is located on the body of the vehicle 100 at a location suitable for detecting wind force (or wind speed or air drag) exerted against the autonomous vehicle 100, such as, but not limited to, the hood, the roof, the side, or any other suitable external location for receiving unobstructed wind forces. Further sensors or detectors may be provided for detecting road conditions of a road surface under or ahead of the vehicle such as, but not limited to one or more of an angle of incline or decline, a radius of curvature or a surface quality of the road surface, or obstacles (size or shape) on the road ahead of the vehicle.

As such, the wind force detector 204*a* may be configured to receive wind and measure the wind speed. In some embodiments, the wind force detector 204*a* is connected to the one or more sensors 204, which measure the wind speed exerted on the wind force detector 204 and report the measurements to the controller 202. In other embodiments, the wind force detector 204*a* is connected directly to the controller 202, which measures the exerted wind speed.

In some embodiments, the roof cargo detector 204*b* is located at the roof of the vehicle 100 at a location suitable for detecting the presence of cargo (e.g., load 104) that is placed (e.g., fastened) to the roof of the autonomous vehicle 100. In some embodiments, the roof cargo detector 204*b* is a weight detector. In other embodiments, the roof cargo detector 204*b* is any other suitable device for detecting the presence of an object on the roof of the vehicle 100, such as, but not limited to, an optical detector, an infrared detector, a pressure sensor, a device that detects physical contact, or the like.

In some embodiments, the roof cargo detector 204*b* is connected to the one or more sensors 204, which determine the presence of roof cargo and report the determination to the controller 202. In other embodiments, the roof cargo detector 204*b* is connected directly to the controller 202, which determines the presence of roof cargo.

In some embodiments, the rear cargo detector 204*c* is located at the rear of the vehicle 100 at a location suitable for detecting the presence of cargo (e.g., trailer 102 or load 106) that is placed (e.g., fastened) to the rear of the autonomous vehicle 100. In some embodiments, the rear cargo detector 204*c* is a camera. In other embodiments, the rear cargo detector 204*c* is any other suitable device for detecting the presence of an object at the rear of the vehicle 100, such as, but not limited to, an optical detector, a weight detector, an infrared detector, a device that detects physical or electrical contact, or the like.

In some embodiments, the rear cargo detector 204*c* is connected to the one or more sensors 204, which determine the presence of rear cargo and report the determination to the controller 202. In other embodiments, the rear cargo detector 204*c* is connected directly to the controller 202, which determines the presence of rear cargo. In further embodiments, a cargo detector is located at other suitable locations of the autonomous vehicle 100 at which cargo would likely be placed, such as, but not limited to, underneath the body, on the sides, at the front, and so on.

In some embodiments, the weight detector 204*d* is provided at a location suitable for detecting the weight of the autonomous vehicle 100. For example, the weight detector 204*d* may be located at a suspension of the vehicle 100, or any other suitable location at which weight of the vehicle 100 is exerted. In some embodiments, the weight detector 204*d* is configured to be sensitive enough to detect whether cargo (e.g., load 104 or load 106) is added to the vehicle 100 by measuring weight of the autonomous vehicle 100.

In some embodiments, the weight detector 204*d* is connected to the one or more sensors 204, which determine whether cargo is detected and report the determination to the controller 202. In other embodiments, the weight detector 204*d* is connected directly to the controller 202, which determines whether cargo is detected.

In some embodiments, the one or more sensors 204 include an engine sensor connected to the engine 206. The engine sensor may be configured to measure one or more characteristics or parameters of the engine 206. In particular embodiments, the engine sensor measures the torque exerted by the engine in determining whether extra load has been added to the autonomous vehicle 100. For example, an increase in torque over the normal torque level may indicate that the shape of the vehicle 100 has changed, since the engine 206 is exerting more energy than normal in propelling the vehicle 100. In some embodiments, the engine sensor is part of the controller 202. In other embodiments, the engine sensor measures other parameters associated with the engine 206 including, but not limited to, revolution per minute, temperature, or the like.

According to various embodiments, the one or more sensors 204 (and/or the detectors 204*a*, 204*b*, 204*c*, and 204*d*) are configured to generally detect a parameter associated with the autonomous vehicle 100 or associated with road conditions or other conditions in the environment around the autonomous vehicle 100. In conjunction with the detecting of the parameters by the sensors 204 (and/or the detectors 204*a*, 204*b*, 204*c*, and 204*d*), the processor 202*b* of the controller 202 may generally determine whether or not a sensed parameter meets or exceeds a threshold or otherwise corresponds to a trigger event (e.g., a changed shape event). If the processor 202*b* determines that the parameter meets or exceeds a threshold or otherwise corresponds to the trigger event, in response, the processor 202*b* may generally control the autonomous vehicle 100 accordingly. In particular embodiments, in response to the parameter meeting or exceeding a threshold and therefore detecting a changed shape event, the controller 202 triggers a scanning procedure for scanning the autonomous vehicle 100 for determining the vehicle's new shape. Further details regarding scanning procedures are discussed below. In other embodiments, the scanning procedure may be triggered by any suitable event, such as manually (e.g., by the driver), periodically (e.g., hourly, daily, every X miles), or other event, such as, but not limited to, a change of speed (e.g., above some threshold), crash detection (e.g., after deployment of airbags), a user entering the vehicle, turning on the vehicle, presence at a particular location, weather change detection, and/or the like.

In some embodiments, the autonomous vehicle 100 may store information or data that corresponds to default or original characteristics or dimensions (sometimes referred to as "original shape") of the vehicle 100 (e.g., height, width, turn radius, and so on), and compares the readings from the sensors 204 with the default data. In some embodiments, the default characteristics or values are pre-programmed into the controller 202 by a manufacturer of the vehicle 100 or by a user of the vehicle 100. As such, the threshold associated with each sensor or parameter may be a threshold that corresponds to a difference between a sensor reading and the default data associated with the autonomous vehicle 100. In some embodiments, the original data may be updated with new default data, for example, if a modification is made to the vehicle 100 such as attaching (e.g., permanently attaching) a bike rack to the top of the vehicle 100.

For example, a storage device in the autonomous vehicle 100 may store an engine torque value that corresponds to the vehicle's default data, may take an engine torque reading via the engine sensor, and may compare the difference between the engine torque reading and the default engine torque value with a threshold to determine whether a changed shape event has occurred at the vehicle 100. In other embodiments, the engine torque reading is compared to the threshold, instead of or in addition to, comparing differences between the engine torque reading and the default engine torque value with a threshold.

Accordingly, to detect a changed shape event, in some embodiments, corresponding thresholds may be associated with each sensor 204 or characteristic of the autonomous vehicle 100 such that the controller 202 does not detect a changed shape event unless a measurement exceeds a threshold associated with the sensor 204 or characteristic. According to various embodiments, the various thresholds and default data associated with the sensors 204 or characteristics may be stored in the memory 202a, for access by the processor 202b. In some embodiments, the thresholds may be programmed into the memory 202a by a manufacturer or a user, and/or may be later modified by a manufacturer or a user, as desired.

According to some embodiments, in response to detecting the changed shape event (or in response to any other suitable trigger), the controller 202 initiates a shape scanning procedure at the autonomous vehicle 100. The shape scanning procedure may be any suitable scanning process for determining the new shape of the autonomous vehicle 100. Further details regarding shape scanning procedures are discussed below.

In some embodiments, the controller 202 offsets other conditions that do not contribute to a shape change of the autonomous vehicle 100, but that may contribute to detection by the one or more sensors 204 and the controller 202 of a shape change event. For example, although an increase in mass may occur at the autonomous vehicle 100, which may result in a detection at the weight sensor 204d or increased torque by the engine sensor, the autonomous vehicle 100 may still not have a changed shape, despite the increased mass.

As a particular example, a user of the autonomous vehicle 100 may load objects inside the vehicle 100, as opposed to outside, which results in increased mass without a change of shape. As such, the weight sensor 204d and the controller 202 may register a shape change event due to the increased weight, or the engine sensor and the controller 202 may register a shape change event due to the increased torque registered at the engine 206 in carrying the added mass. However, because the objects are loaded inside of the autonomous vehicle 100, as opposed to outside, the autonomous vehicle 100 has not actually changed shape. Similarly, conditions beyond the autonomous vehicle 100, such as, but not limited to, weather (e.g., head winds), road slope, road conditions or terrain, and so on, may also contribute to false detections of shape change events by the one or more sensors 204.

Accordingly, in some embodiments, the controller 202 receives information regarding these conditions that contribute to false detections of a shape change event, and offsets or incorporates the data in its determination of whether a shape change event has occurred. In particular embodiments, a user inputs whether cargo has been placed inside the vehicle 100 via the UI 208, which the controller 202 considers in its determination of whether a shape change event has occurred. In further embodiments, the controller 202 receives weather updates and road condition updates (e.g., via the wireless communication device 210). In yet further embodiments, the one or more sensors 204 further include a grade or slope sensor (e.g., an accelerometer, gyroscope, imaging device or the like) configured to determine an angle of incline or decline of the autonomous vehicle 100 or of the road surface ahead of the autonomous vehicle. As such, in some embodiments, the controller 202 is configured to offset the received data that contributes to false detections from readings made by the one or more sensors 204 to accurately detect whether a change shape event has occurred.

Although the autonomous vehicle 100 is described as including an engine 206, in other embodiments, the vehicle 100 includes other types of propulsion systems. For example, the vehicle 100 may be driven using electrical energy. In other embodiments, the autonomous vehicle 100 is powered by hydrogen fuel or by a hybrid system including two or more of the above-mentioned propulsion systems. In such embodiments, other suitable parameters of the particular propulsion system are sensed by the one or more sensors 204 in detecting a changed shape event of the vehicle 100 (e.g., the sensors 204 may monitor output power of a vehicle powered by electrical energy in detecting a changed shape event).

According to some embodiments, the autonomous vehicle 100 further includes the UI 208. The UI 208 may include any suitable interactive mechanism for allowing a user to input information or commands, such as, but not limited, a touchscreen, a keypad, or the like. The UI 208 may transmit the inputs or commands to the controller 202, and the controller 202 may control operation of the vehicle 100 in response to the received inputs and commands. In some embodiments, the user inputs via the UI 208 whether the vehicle 100 has a changed shape, resulting in a detection of a changed shape event by the controller 202. In further embodiments, the user inputs via the UI 208 default characteristics or dimensions of the autonomous vehicle 100 or dimensions of cargo added to the vehicle 100, whether cargo was added inside the vehicle, and so on. In other embodiments, the UI 208 is a device separate from the autonomous vehicle 100 that is in wireless communication with the autonomous vehicle 100 via the wireless communication device 210. In such embodiments, the UI 208 includes, but is not limited to, a mobile phone, a tablet, a computer, or the like.

According to some embodiments, the autonomous vehicle 100 includes the wireless communication device 210. In some embodiments, the wireless communication device 210 may include a receiver, a transmitter, or a transceiver, corresponding to a particular radio frequency (RF) band, for communication in a wireless communication network. Examples of a wireless communication device 210 include, but are not limited to, a wireless local area network (WLAN) device, a wireless wide area network (WWAN) device, a personal area network (PAN) device, and/or the like.

The wireless communication device 210 may be configured to facilitate wireless communication between the autonomous vehicle 100 and other devices separate from the autonomous vehicle 100 such as, but not limited to, a user's mobile phone or other wireless communication device, another vehicle, a central entity (e.g., traffic control), a server, and/or the like. In particular embodiments, the wireless communication device 210 is configured to transmit and/or receive radio signals corresponding to wireless protocols such as, but not limited to, Wi-Fi, Bluetooth, Long-Term Evolution (LTE), Code Division Multiple Access (CDMA), Wideband Code Division Multiple Access (WCDMA), Global Systems for Mobile Communications (GSM), any other suitable wireless communication protocol, and/or combinations thereof.

In particular embodiments, the wireless communication device 210 is configured to perform vehicle-to-vehicle (V2V) communication with other vehicles on the road or other vehicles (e.g., other proximate vehicles). As such, the autonomous vehicle 100 is configured to transmit and receive information (e.g., safety warnings, traffic information, etc.) or requests and responses to the requests with other vehicles. In some embodiments, the wireless communication device 210 configured to perform V2V communications is a dedicated short-range communication (DSRC) device. In such embodiments, the wireless communication device 210 is configured to operate in a 5.9 GHz band with a bandwidth of 75 MHz at a range of about 1000 m.

In some embodiments, the processor 202b is coupled to the wireless communication device 210 for receiving and/or transmitting radio frequency signals. In other embodiments, the processor 202b performs the functions of the wireless communication device 210 such that a separate wireless communication device 210 module is not used.

According to some embodiments, the autonomous vehicle 100 includes the LIDAR device 212. The LIDAR device 212 may be configured to scan surrounding objects during operation of the autonomous vehicle 100. The LIDAR device 212 may send the scanning data to the controller 202, and the controller 202 may operate the vehicle 100 based on the scanning data (e.g., the controller 202 may command the engine 206 to decrease the speed of the vehicle 100 based on scanning data that shows a slow vehicle ahead). In other embodiments, any suitable environment imaging device can be used in the autonomous vehicle 100 instead of or in addition to LIDAR, such as, but not limited to, radar, Global Positioning System (GPS), odometry, computer vision, or the like.

Figure 3B:
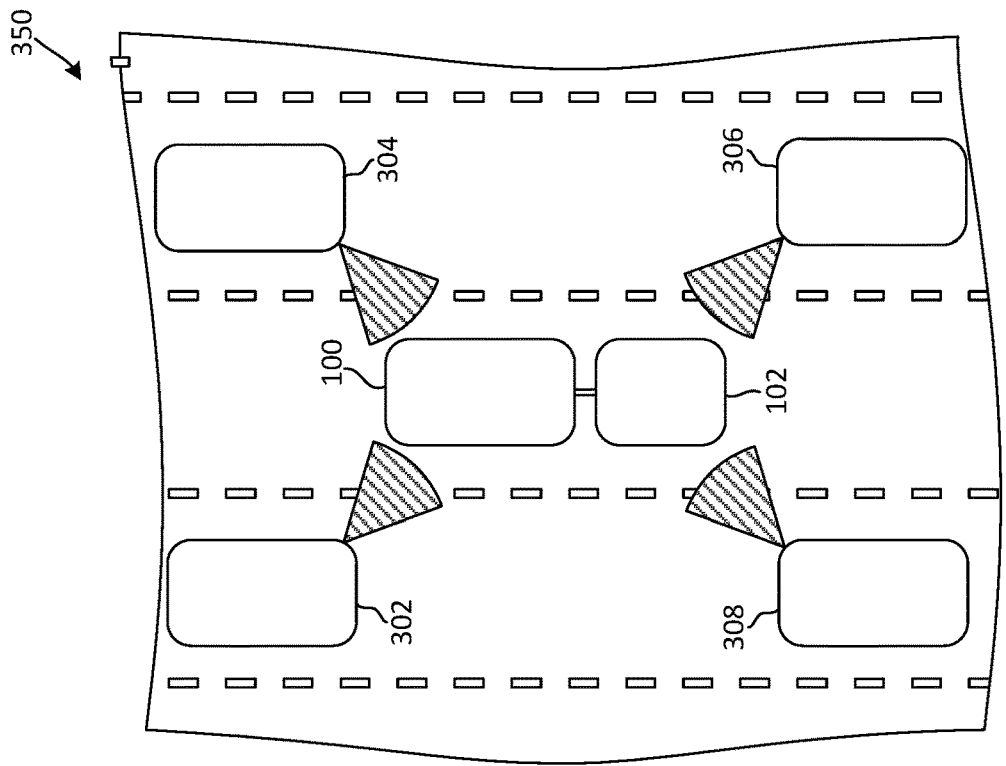
FIGS. 3A and 3B are diagrams of overhead views of a plurality of autonomous vehicles on a road according to various embodiments.
Figure 3A:
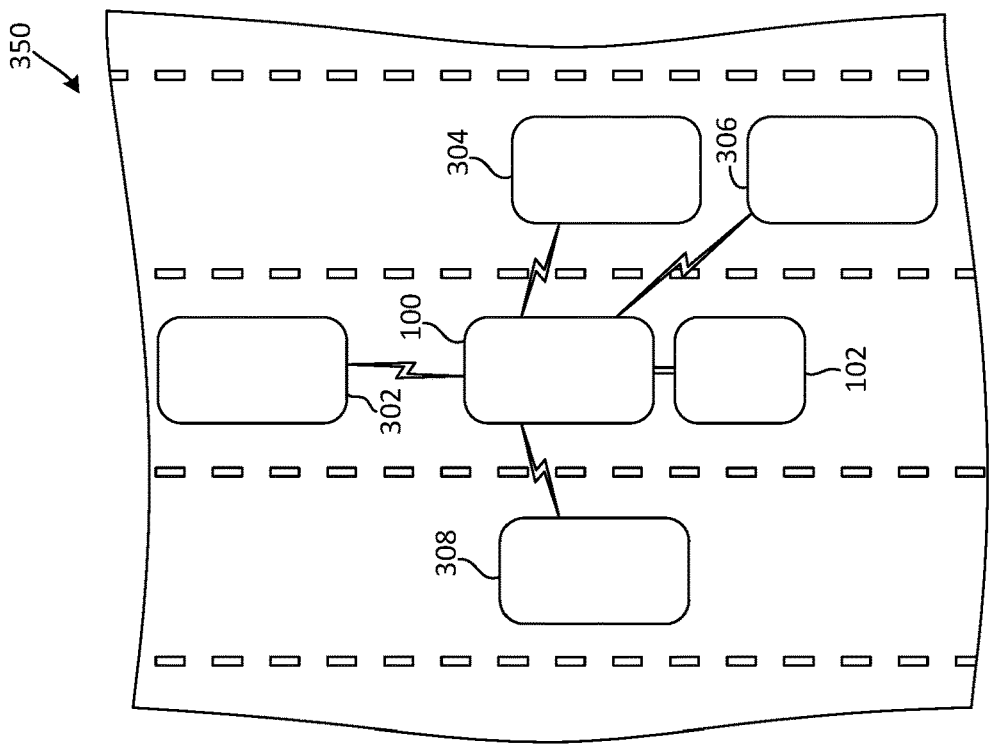

FIGS. 3A and 3B are overhead views of diagrams illustrating a plurality of autonomous vehicles on a road 350 according to various embodiments. Referring to FIGS. 1A-3B, the autonomous vehicle 100 is being driven or operated on road 350. Furthermore, the autonomous vehicle 100 may be towing a trailer 102, resulting in a changed shape event of the autonomous vehicle 100 due to the addition of the trailer 102 to the vehicle 100. As such, in some embodiments, the autonomous vehicle 100 detects the changed shape event caused by the added trailer (e.g., using the one or more sensors 204 and the controller 202).

Also, on the road 350 are a plurality of proximate autonomous vehicles 302, 304, 306, and 308 near the autonomous vehicle 100. In some embodiments, in response to the detection of the changed shape event caused by the added trailer 102 to the vehicle 100, the vehicle 100 initiates a scanning procedure for determining the dimensions of its new shape. In some embodiments, the autonomous vehicle 100 relies on other vehicles on the road, such as proximate vehicles 302, 304, 306, and 308, in determining its new shape dimensions.

According to some embodiments, the autonomous vehicle 100 sends scanning requests to a plurality of the proximate vehicles 302, 304, 306, and 308 for scanning of the vehicle 100. In particular embodiments, the autonomous vehicle 100 sends the scanning requests to one or more vehicles within a designated distance from the vehicle 100. The autonomous vehicle 100 may use the wireless communication device 210 to communicate with the proximate vehicles 304, 304, 306, and 308 using V2V communication. Likewise, the proximate vehicles 304, 304, 306, and 308 may communicate with the autonomous vehicle 100 over V2V communication via the wireless communication device 210.

In some embodiments, one or more of the proximate vehicles 302, 304, 306, and 308 receiving the scanning request accepts the request and proceeds to approach (if not already adjacent) the requesting vehicle. For example, the autonomous vehicle 100 may send requests to each of the plurality of proximate vehicles 302, 304, 306, and 308, which are located around the autonomous vehicle 100 (e.g., as shown in FIG. 3A). In response to accepting the requests, one or more of the proximate vehicles 302, 304, 306, and 308 may capture at least a partial image or other representation of the new shape of the autonomous vehicle 100.

In particular embodiments, one or more of the proximate vehicles 302, 304, 306, and 308 may arrange itself around the autonomous vehicle 100 to capture a better (e.g., more complete) image or other representation of the new shape of the autonomous vehicle 100. In some embodiments, the autonomous vehicle 100 directs each of the proximate vehicles 302, 304, 306, and 308 to optimize the coverage of the scans. In other embodiments, the proximate vehicles 302, 304, 306, and 308 communicate among themselves to position themselves for optimizing scan coverage. In some embodiments, the scanning vehicles 302, 304, 306, and 308 receive GPS positioning data of the requesting vehicle 100 for locating the requesting vehicle 100 and positioning themselves around the requesting vehicle 100. For instance, the four proximate vehicles 302, 304, 306, and 308 position themselves at four corners surrounding the vehicle 100 for maximum scan coverage (e.g., as shown in FIG. 3B). The scans performed by each of the proximate vehicles 302, 304, 306, and 308 may be LIDAR scans by respective LIDAR devices of each of the proximate vehicles 302, 304, 306, and 308.

In some embodiments, the autonomous vehicle 100 may be configured to arrange itself relative to the proximate vehicles to allow the one or more proximate vehicles 302, 304, 306, and 308 to capture a better (e.g., more complete) image or representation of the new shape of the autonomous vehicle 100.

In some embodiments, the captured image(s) may represent a full image or representation of the new shape of the autonomous vehicle 100 when the images/representations are later combined. In other embodiments, the captured images(s) may represent a partial image or representation of the new shape of the autonomous vehicle when the images/representations are later combined.

In some embodiments, the scan requests sent by the vehicle 100 include locating information corresponding to the vehicle 100. In some embodiments, the proximate vehicle 302 sends locating information to proximate vehicle 304 so that proximate vehicle 304 can position itself with respect to proximate vehicle 302 around vehicle 100, and proximate vehicle 304 can then send locating information to proximate vehicle 306, and so on. In other embodiments, the proximate vehicles 302, 304, 306, and 308 send their respective location information to the autonomous vehicle 100, and the vehicle 100 directs positioning of each of the proximate vehicles 302, 304, 306, and 308. In other embodiments, the proximate vehicles 302, 304, 306, and 308 simply perform scanning of the autonomous vehicle 100 from their respective original locations, without positioning themselves.

In some embodiments, once each of the proximate scanning vehicles 302, 304, 306, and 308 completes their scans of their respective portion of the vehicle 100, the scanning vehicles 302, 304, 306, and 308 transmit the scanned information to the requesting vehicle 100 via V2V communication. In some embodiments, upon receiving the plurality of partial scans, the vehicle 100 combines the partial scans to construct a scan of itself, and therefore the vehicle 100 is able to update its shape and dimension information. In some embodiments, the LIDAR device 212 of the vehicle 100 constructs the completed shape scan based on the received plurality of partial scans. In other embodiments, the controller 202 generates the completed shape scan.

In other embodiments, instead of V2V communication, the vehicles 100, 302, 304, 306, and 308 communicate via a central station (e.g., a base station or a central server). For example, in some embodiments, the vehicle 100 sends a request to the central station to facilitate a scanning procedure, the central station sends directives to one or more of the proximate vehicles 302, 304, 306, and 308 to perform the scanning of the vehicle 100, the central station receives the plurality of partial scans, and the central station transmits the partial scans (or a constructed complete scan) to the vehicle 100. In some embodiments, the central station positions the proximate vehicles 302, 304, 306, and 308 for optimally scanning the autonomous vehicle 100, and thus the central station receives location information from each of the vehicles 100, 302, 304, 306, and 308. In further embodiments, the communication protocols are a hybrid of V2V and the central station (e.g., some communications are performed V2V, while other communications are performed via the central station).

In some embodiments, the vehicle 100 is configured to inhibit engagement of auto-pilot capabilities, once it has detected that its shape has changed, but then allows engagement of auto-pilot capabilities after the updated shape is scanned, received, and constructed.

According to other embodiments, upon or in response to detecting a changed shape event (or other suitable triggering event), the vehicle triggers different shape scanning procedures for determining the vehicle's updated shape, instead of or in addition to, the proximate vehicle summoning scanning procedure described above. Other shape scanning procedures may include one or more of a user manually scanning the vehicle or inputting dimensions of the vehicle (e.g., via UI 208), scanning performed by scanners located at designated checkpoints along a road or other fixed scanning devices, scanning by a manned or an unmanned aerial vehicle, scanning via scanners or cameras located at the user's garage, parking locations, or on the vehicle, or the like. In some embodiments, the scanning checkpoints are scanning booths (e.g., similar to toll booths) constructed on roads or highways.

In some embodiments, scanning performed by designated checkpoint scanners receive a scan request from the vehicle 100 before the vehicle 100 passes the scanners, scan the vehicle 100 when the vehicle 100 is proximate the scanners, and transmit the scanned vehicle's dimensions and shape to the vehicle 100 via wireless communication (e.g., via the central station or directly the vehicle 100). Similarly, scanning performed by a UAV may receive the scan request, scan the vehicle 100, and transmit the scanned information to the vehicle 100 (directly or indirectly).

Accordingly, in various embodiments, because of the scanning procedure performed on the vehicle 100 having a changed shape, the vehicle 100 is configured to determine the updated dimensions of its body including the added cargo (e.g., trailer). For example, the vehicle 100 may be configured to determine a precise length, width, and height of added cargo, and the precise overall length, width, and height of the overall shape of the vehicle 100 having the changed shape. Moreover, the vehicle 100 is configured to adjust operation based on the updated dimensions of the changed shape.

Accordingly, in some embodiments, with the updated shape information, the vehicle 100 via the controller 202 can adjust its operation, such as, but not limited to, braking distance, turn radius, parking behavior (e.g., whether the vehicle 100 will fit in a parking space), height and depth clearance allowances, or the like. For example, if the updated shape information discovers a significant increase in the height of the vehicle 100 (e.g., due to load 104), the controller may restrict the vehicle 100 from driving on roads that have low height clearances that extend below the new height of the vehicle 100. As such, the navigation path may be updated to a new navigation path that provides sufficient clearance for the new height or any other change in the shape of the vehicle 100. In particular embodiments, the updated vehicle shape information is sent to a central system that tracks changing shapes of vehicles (e.g., a central system that tracks or controls traffic or levies taxes or tolls based on sizes or weights of vehicles, a central delivery system that keeps track of designated vehicles that pull cargo, or the like).

In some embodiments, new shapes are saved (e.g., in a database of controlling electronics 201) and accessed or reloaded for future use. For example, after updating its shape data (e.g., after a trailer has been added to the autonomous vehicle 100), the autonomous vehicle 100 may save its new shape including the added trailer. Accordingly, when the same trailer is once again attached to the autonomous vehicle 100 in the future, the saved shape data may be reused rather than the vehicle 100 triggering another scanning procedure on itself for the same trailer. Likewise, in some embodiments, profiles for cargo may be accessed and downloaded to the autonomous vehicle 100 for saving. For example, a specific trailer may be provided with a download link (or other data source) that includes shape information of the trailer, which can be used to update the new shape of the autonomous vehicle 100.

Figure 4:
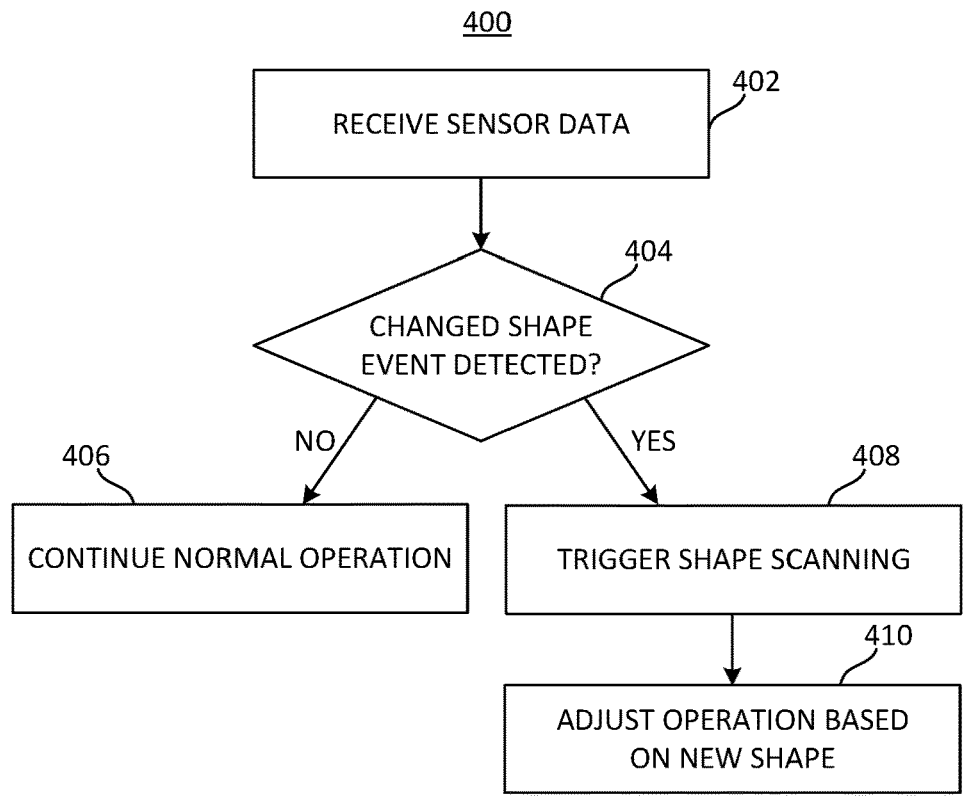
FIG. 4 is a flowchart diagram illustrating a method of controlling an autonomous vehicle according to various embodiments.

FIG. 4 is a flowchart diagram illustrating a method 400 of controlling an autonomous vehicle (e.g., the autonomous vehicle 100 in FIGS. 1A-3B) according to various embodiments. Referring to FIGS. 1A-4, in various embodiments, the method 400 is performed by the controller 202 (e.g., the processor 202*b* of the controller 202). At block 402, the controller 202 receives sensor data. The sensor data may be sensed by and received from the one or more sensors 204 and/or the detectors 204*a*, 204*b*, 204*c*, and 204*d*.

At block 404, the controller 202 determines whether a changed shape event is detected based on the received sensor data. The controller 202 may take into account and offset sensed values that contribute to a false positive detection (e.g., road incline, high head winds, cargo inside the vehicle 100, or the like) in determining whether a changed shape event at the vehicle has occurred.

At block 406, if a changed shape event is not detected (404: NO), then the controller 202 continues normal operation of the vehicle 100 in accordance with its original or manufacturer shape data. At block 408, if a changed shape event is detected (404: YES), then the controller 202 triggers a shape scanning procedure. The shape scanning procedure may include summoning one or more proximate vehicles to scan the shape-changed vehicle, and receiving the scans via V2V communication from the scanning vehicles.

At block 410, the controller 202 adjusts operation of the changed-shape vehicle based on the updated shape or dimension data. For example, the controller 202 may adjust a speed, a braking distance, a turn radius, a navigation path, or the like of the changed-shape vehicle.

Figure 5:
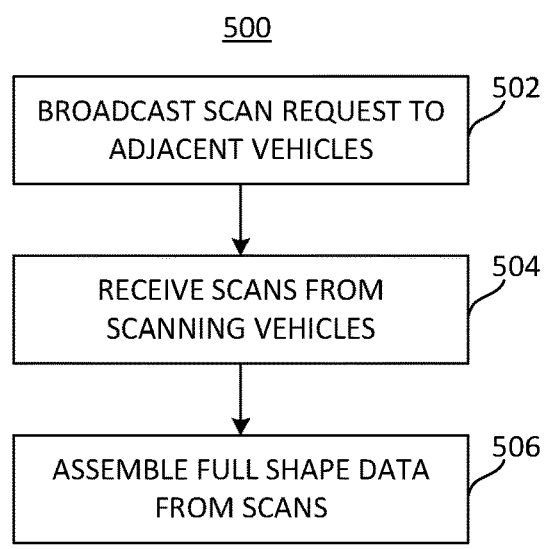
FIG. 5 is a flowchart diagram illustrating a method of performing a shape scan of an autonomous vehicle according to various embodiments.

FIG. 5 is a flowchart diagram illustrating a method 500 of performing a shape scan of an autonomous vehicle (e.g., the autonomous vehicle 100 in FIGS. 1A-3B) according to various embodiments. Referring to FIGS. 1A-5, in various embodiments, the method 500 is performed by the controller 202 (e.g., by the processor 202*b* of the controller 202). At block 502, the controller 202 broadcasts a scan request to proximate or adjacent vehicles. In response to the scan request, one or more proximate vehicles may accept the scan request, and may optionally proceed to position themselves for optimal coverage in scanning of the requesting vehicle.

At block 504, once the scanning vehicles have completed their scans, the controller 202 receives the scans from the scanning vehicles (e.g., via the wireless communication device 210 over V2V communication). At block 506, the controller 202 assembles the complete shape data based on the plurality of received scans from the scanning vehicles. In some embodiments, each of the scanning vehicles performs partial scans of the requesting vehicle, which the requesting vehicle may assemble to generate a complete scan (e.g., assembled by the LIDAR device 212 and/or the controller 202).

Accordingly, in various embodiments, multiple sensors work together through the controller 202 to safely operate the vehicle 100. In particular, traditional sensors of the autonomous vehicle 100, such as sensors that measure characteristics of the vehicle 100 itself (e.g., engine torque or weight) and sensors that measure characteristics of the environment surrounding the vehicle 100 (e.g., objects on the road or road curvature or slope), are utilized in addition to the information regarding a change of shape of the vehicle 100 in operation of the vehicle.

For example, the vehicle 100 may use a weight sensor to determine a weight of the vehicle and an accelerometer to determine an incline of a road to calculate the torque needed by the engine 206 in traversing the inclined road. In addition, according to various embodiments, the vehicle 100 is configured to incorporate its updated shape information in also determining the torque needed in traversing the inclined road. Accordingly, the updated shape information is an additional parameter that the car 100 incorporates in its calculations and operations, in addition to the traditional information used by autonomous vehicles.

As another example, the vehicle 100 towing the trailer 102 may scan the road ahead to determine a curvature of the road (e.g., using the LIDAR device 212). Furthermore, the vehicle 100 may utilize a temperature sensor to determine heat accumulation of the brakes of the vehicle 100. Finally, in various embodiments, the vehicle 100 can access its updated shape information, which provides the new dimensions of the vehicle 100 having the trailer 102, to determine an optimal turn radius for safely traversing the curvature in the road, in addition to using the environment scanning information and the temperature sensor information.

The above used terms, including "attached," "connected," "fastened," "secured," "coupled," "integrated," and the like are used interchangeably. In addition, while certain embodiments have been described to include a first element as being "coupled" (or "attached," "connected," "fastened," etc.) to a second element, the first element may be directly coupled to the second element or may be indirectly coupled to the second element via a third element.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. A method for controlling a vehicle, the method comprising:
   detecting, by a sensor, a triggering event;
   determining updated dimensions of the vehicle in response to detecting the triggering event; and
   adjusting, by control electronics, at least one operation of the vehicle, wherein the at least one operation of the vehicle comprises an adjustment of at least one of a speed, a turn radius, a navigation path, a clearance allowance, or a parking behavior of the vehicle based at least in part on the updated dimensions.

2. The method of claim 1, wherein the triggering event comprises a changed shape event.

3. The method of claim 2, wherein the changed shape event comprises detecting a parameter associated with the vehicle and determining whether the parameter exceeds a threshold.

4. The method of claim 3, wherein the parameter corresponds to one or more of a weight parameter, a wind parameter, a drag parameter, or an engine torque value.

5. The method of claim 2, further comprising:
   determining one or more surrounding conditions of the vehicle; and
   detecting the changed shape event of the vehicle based at least in part on the one or more surrounding conditions.

6. The method of claim 5, wherein the one or more surrounding conditions comprises at least one of a wind force, a road slope, a radius of curvature of a road, or road terrain conditions.

7. The method of claim 1, wherein determining the updated dimensions of the vehicle comprises:
   sending a scan request to one or more proximate vehicles;
   receiving one or more at least partial scans of at least one of the one or more proximate vehicles; and
   constructing the updated dimensions of the vehicle based at least in part on at least one of the one or more at least partial scans.

8. The method of claim 7, wherein the scan request is sent via vehicle-to-vehicle (V2V) communication.

9. The method of claim 7, wherein the one or more at least partial scans comprises at least one Light Detection and Ranging (LIDAR) scan.

10. The method of claim 1, wherein the at least one operation of the vehicle serves to control braking, to perform wireless communication, or to perform environment scanning.

11. The method of claim 1, further comprising configuring at least one of an engine sensor, a weight sensor, a wind sensor, or a cargo sensor.

12. The method of claim 1, wherein determining the updated dimensions of the vehicle comprises:
   sending a scan request to one or more scanning devices of the vehicle;
   receiving an at least partial scan from at least one of the one or more scanning devices; and
   constructing the updated dimensions of the vehicle based on at least one of the at least partial scan.

13. The method of claim 12, wherein the at least partial scan is received from another vehicle.

14. The method of claim 12, wherein the at least partial scan is received from an unmanned aerial vehicle.

15. The method of claim 12, wherein the at least partial scan is received from a camera arranged on a fixed object.

16. A controller in a vehicle, the controller comprising:
   a processor; and
   a memory storing instructions that, when executed by the processor, cause the vehicle to:
   detect a triggering event;
   determine updated dimensions of the vehicle in response to detection of the triggering event; and
   adjust at least one operation of the vehicle, wherein the at least one operation of the vehicle comprises an adjustment of at least one of a speed, a turn radius, a navigation path, a clearance allowance, or a parking behavior of the vehicle based at least in part on the updated dimensions.

17. The controller of claim 16, wherein the triggering event comprises detecting a changed shape event.

18. The controller of claim 17, wherein execution of the instructions causes the vehicle to:
   detect a parameter associated with the vehicle; and
   determine whether the parameter exceeds a threshold.

19. The controller of claim 18, wherein the parameter corresponds to one or more of a weight parameter, a wind parameter, a drag parameter, or an engine torque parameter.

20. The controller of claim 17, wherein execution of the instructions causes the vehicle to further:
   determine one or more surrounding conditions of the vehicle; and
   detect the changed shape event of the vehicle based at least in part on the one or more surrounding conditions.

21. The controller of claim 20, wherein the one or more surrounding conditions comprises at least one of a wind force, a road slope, a radius of curvature of a road, or road terrain conditions.

22. The controller of claim 16, wherein execution of the instructions for determining the updated dimensions further causes the vehicle to:
   send a scan request to one or more proximate vehicles;
   receive one or more at least partial scan of at least one of the one or more proximate vehicles; and
   construct the updated dimensions of the vehicle based at least in part on at least one of the one or more at least partial scans.

23. The controller of claim 22, wherein the one or more at least partial scans comprises at least one Light Detection and Ranging (LIDAR) scan.

24. The controller of claim 16, wherein execution of the instructions causes the vehicle to control braking, to perform wireless communication, or to perform environment scanning.

25. The controller of claim 16, wherein execution of the instructions causes the vehicle to:
   send a scan request to one or more scanning devices of the vehicle;
   receive an at least partial scan from at least one of the one or more scanning devices; and
   construct the updated dimensions of the vehicle based on the at least partial scan.

26. The controller of claim 25, wherein at least a partial scan is received from another vehicle.

27. An apparatus for controlling a vehicle, the apparatus comprising:
   means for detecting a triggering event;
   means for determining updated dimensions of the vehicle in response to detecting the triggering event; and
   means for adjusting at least one operation of the vehicle, wherein the at least one operation of the vehicle comprises an adjustment of at least one of a speed, a turn radius, a navigation path, a clearance allowance, or a parking behavior of the vehicle based at least in part on the updated dimensions.

28. The apparatus of claim 27, wherein the triggering event comprises a changed shape event.

29. The apparatus of claim 28, wherein the changed shape event comprises detecting a parameter associated with the vehicle and determining whether the parameter exceeds a threshold.

30. The apparatus of claim 29, wherein the parameter corresponds to one or more of a weight parameter, a wind parameter, a drag parameter, or an engine torque value.

* * * * *